(12) United States Patent
Moser et al.

(10) Patent No.: US 7,740,089 B2
(45) Date of Patent: Jun. 22, 2010

(54) DRILLING TOOL WITH A CUTTING ELEMENT THAT IS CONFIGURED AS A PLATE OR HEAD

(75) Inventors: Bernhard Moser, Altshausen (DE); Rainer Widmann, Ravensburg (DE)

(73) Assignee: Robert Bosch GmbH, Stuttgart (DE)

( * ) Notice: Subject to any disclaimer, the term of this patent is extended or adjusted under 35 U.S.C. 154(b) by 552 days.

(21) Appl. No.: 10/589,317

(22) PCT Filed: Aug. 4, 2005

(86) PCT No.: PCT/EP2005/053851

§ 371 (c)(1),
(2), (4) Date: Aug. 14, 2006

(87) PCT Pub. No.: WO2006/034912

PCT Pub. Date: Apr. 6, 2006

(65) Prior Publication Data

US 2007/0169965 A1     Jul. 26, 2007

(30) Foreign Application Priority Data

Sep. 30, 2004   (DE)   .................. 10 2004 047 469

(51) Int. Cl.
*E21B 10/58* (2006.01)

(52) U.S. Cl. .................... 175/420.1; 175/415; 408/227
(58) Field of Classification Search ................ 175/415, 175/420.1, 427, 430; 408/227, 230
See application file for complete search history.

(56) References Cited

U.S. PATENT DOCUMENTS

| | | | |
|---|---|---|---|
| 6,595,305 B1 * | 7/2003 | Dunn et al. ............... | 175/420.1 |
| 2005/0103532 A1 * | 5/2005 | Magin ........................ | 175/415 |
| 2006/0118341 A1 * | 6/2006 | Huber ....................... | 175/420.1 |

FOREIGN PATENT DOCUMENTS

DE          197 34 094          5/1998

* cited by examiner

*Primary Examiner*—David J Bagnell
*Assistant Examiner*—Robert E Fuller
(74) *Attorney, Agent, or Firm*—Michael J. Striker

(57) ABSTRACT

The invention relates to a drilling tool, especially for percussion drilling, which comprises a cutting element (3) that is configured as a plate (3) or head and that has at least one cutting edge (11) defined by a cutting face (6) and a free face (10). The cutting edge (11) is associated with a first free face section (10a) which is limited in a cutting plane at a right angle to the cutting edge (11) and parallel to the longitudinal axis (L) of the drilling tool (1) by a convex bulge (13) or a convex polygon outline. The vertical height of a rib (14) defined by the first free face section (10a) and an associated first cutting face section (6a) ranges from 0.1 mm to 1.0 mm.

10 Claims, 8 Drawing Sheets

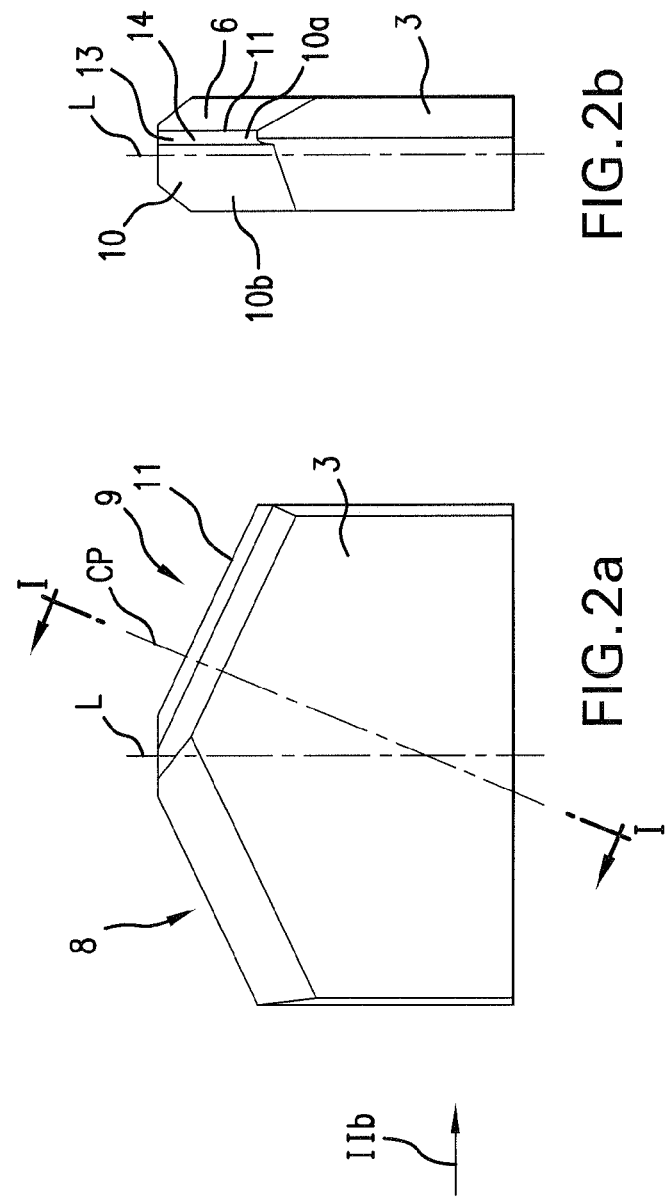

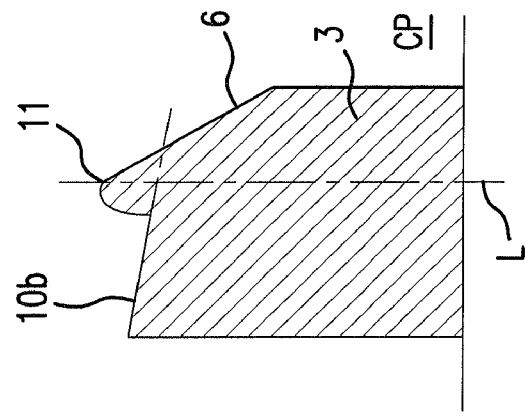
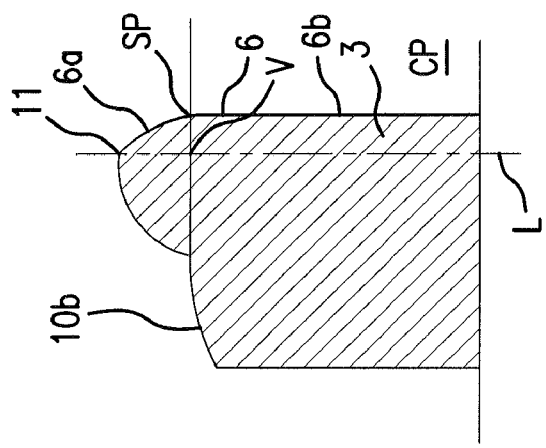
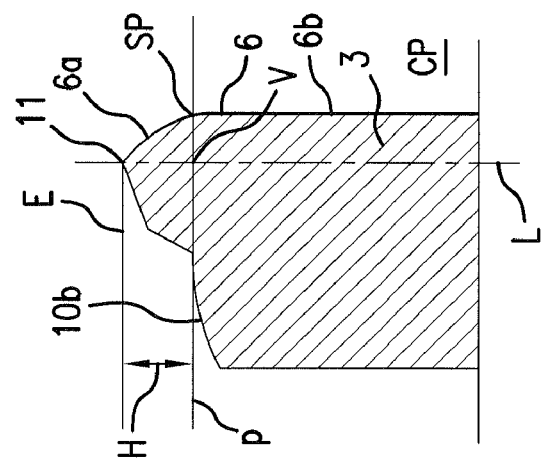

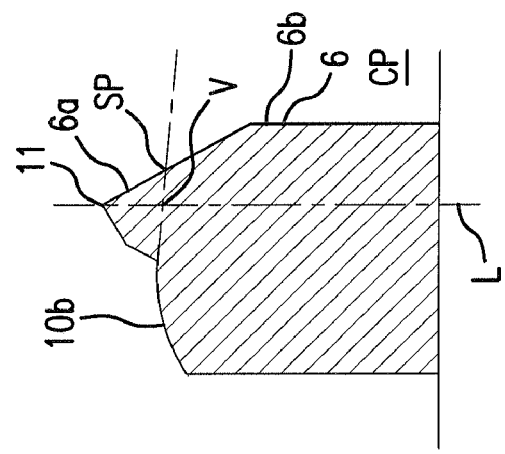
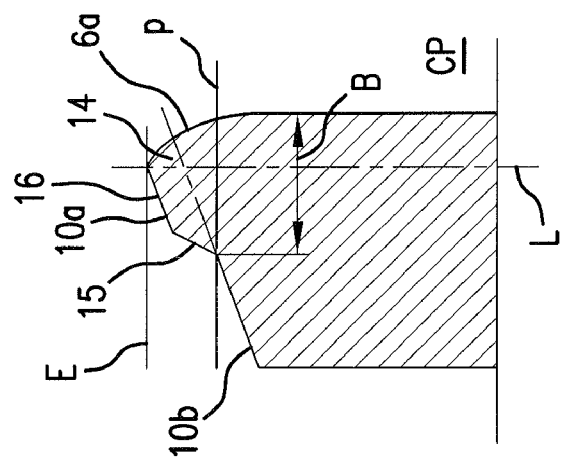
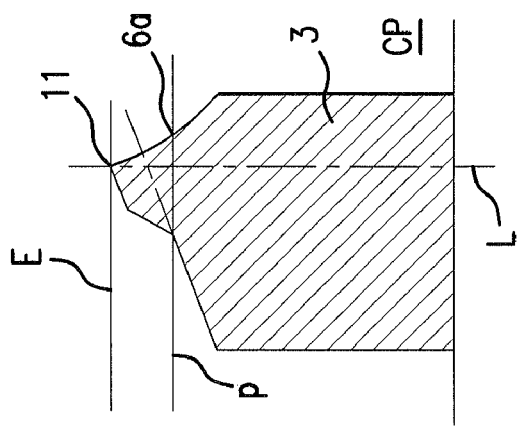

DRILLING TOOL WITH A CUTTING ELEMENT THAT IS CONFIGURED AS A PLATE OR HEAD

CROSS-REFERENCE

The invention described and claimed hereinbelow is also described in PCT/EP 2005/0053851, filed on Aug. 4, 2005 and DE 102004047469.9, filed Sep. 30, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a drilling tool.

Publication DE 197 34 094 A1 makes known a rock drill that includes a cutting element that is configured as a plate and that has at least one cutting edge defined by a cutting face and a free face. The free face is defined by a first section with a small free face angle and a second section with a larger free face angle, in order to enhance the penetration of the rock drill into the material.

The object of the present invention is to provide a drilling tool with a cutting element that, in the region of the cutting edge, is optimal for penetration of the material to be worked, and that has an overall robust design.

SUMMARY OF THE INVENTION

The drilling tool according to the present invention for percussion drilling in particular has a first free face section on the cutting edge that is limited by a convex bulge or a convex polygon outline as viewed in a cutting plane that is cut at a right angle to the cutting edge. The vertical height of a rib defined by this first free face section and an associated first cutting face section ranges from 0.1 mm to 1.0 mm This projecting design of the first free face section with the special dimensions of the projection ensures that the projection penetrates the material with little resistance and has a height that is greater than or equal to the depth of penetration of the drilling tool with a single impact. As a result, the drilling tool is prevented from being braked by the subsequent second free face section. Nor is it necessary to design the first section of the free face as a compromise between different requirements. The core of the present invention, therefore, is to design an aggressive cutting geometry tailored to the depth of penetration by the drilling tool with a single impact while supporting the cutting surface in an optimum manner. In a 1/10 mm range, the cutting lip or the close range of the cutting edge defined by the cutting face and the first free face section is designed as a rib or an impact body that enables optimal penetration of the material with a high level of stability.

According to an advantageous design of the object of the present invention, the vertical dimension or height of the rib is designed to range from 0.1 mm to 0.5 mm in particular. In this range, the depth of penetration of drilling tools in concrete or stone typically has a diameter of up to 30 mm. Greater penetration depths are attained when the material is particularly soft, of course, which requires that the drilling tool be adapted accordingly.

In addition, an increase in the vertical height of the rib toward the longitudinal axis is provided. As a result, increased wear in the region of the longitudinal axis of the drilling tool can be accommodated, the increased wear resulting, e.g., from drilling into strongly reinforced concrete.

The present invention also provides for a drilling tool, the vertical height of the rib of which decreases toward the longitudinal axis. A geometry of this type is provided, e.g., for boring out pre-bored holes, since increased wear takes place there in an annular outer region.

According to the present invention, at least one second free face section follows the first free face section. This makes it possible for the cutting element to be widened and stabilized.

The present invention also provides that a first cutting face section follows at least one second cutting face section, so that the properties of the drilling tool can also be influenced in the region of the cutting face.

According to the present invention, an imaginary extension of the second free face section intersects the cutting element or the cutting face below the cutting edge. By orienting the second free face section in this manner, a stable basic design of the drilling tool is ensured.

BRIEF DESCRIPTION OF THE DRAWINGS

Further details of the present invention are described in the drawing with reference to schematically depicted exemplary embodiments.

FIGS. 2a through 2e show different views of the cutting plate of the drilling tool shown in FIGS. 1a through 1c;

FIGS. 4 through 14 show schematic sectional views through cutting elements of different drilling tools.

All figures are intended to be schematic figures, in the case of which the ribs, in particular, are depicted larger in size, in order to show their shape exactly.

DETAILED DESCRIPTION OF THE PREFERRED EMBODIMENTS

Figure 1A:
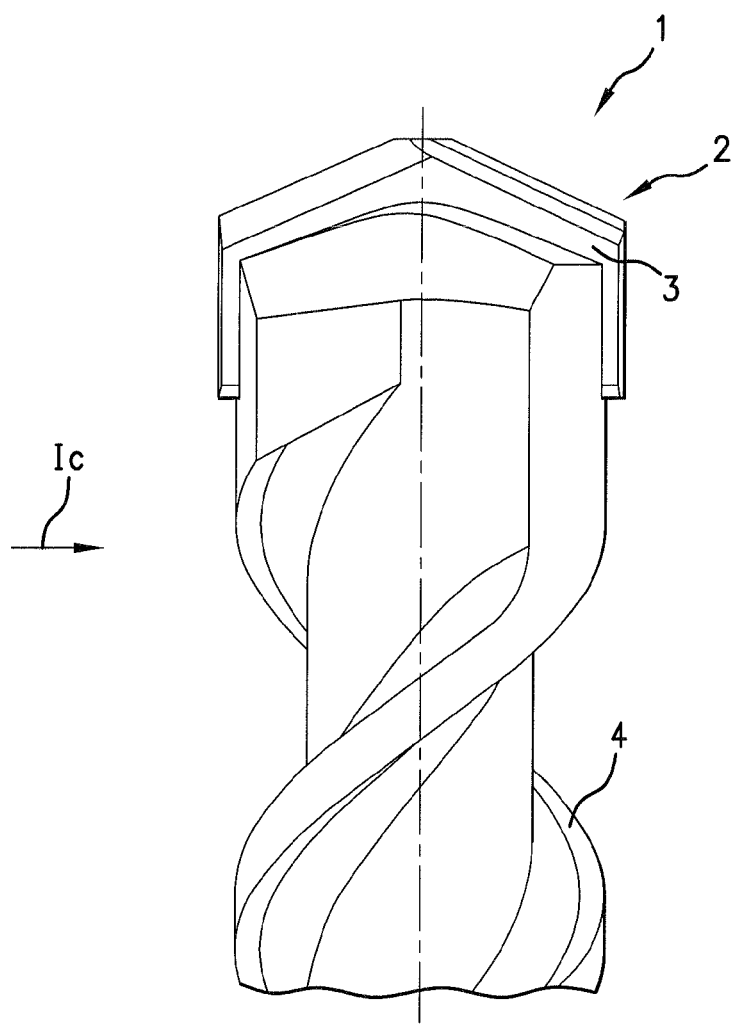
FIGS. 1a through 1c show various partial views of a drilling tool according to the present invention.

A side view of a portion of drilling tool 1 is shown in FIG. 1a. Drilling tool 1 includes a boring head 2 with a cutting element 3, designed as a cutting plate 3, and a drill twist 4. An insertion shaft, into which drill twist 4 transitions via its further, not-shown course, is not shown. This insertion shaft is designed, e.g., as a cylindrical or hexagonal insertion shaft, or as an SDS max insertion shaft or an SDS plus insertion shaft.

Figure 1B:
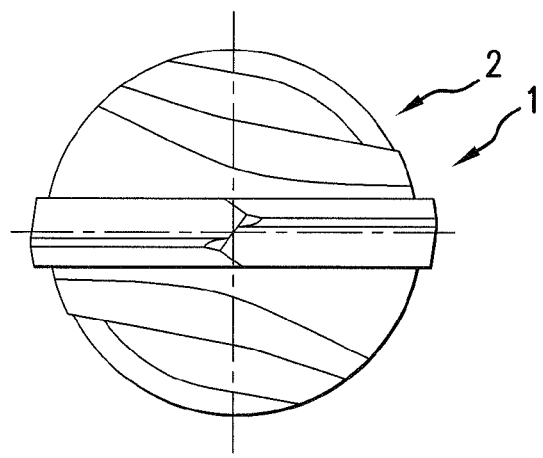
Figure 1C:
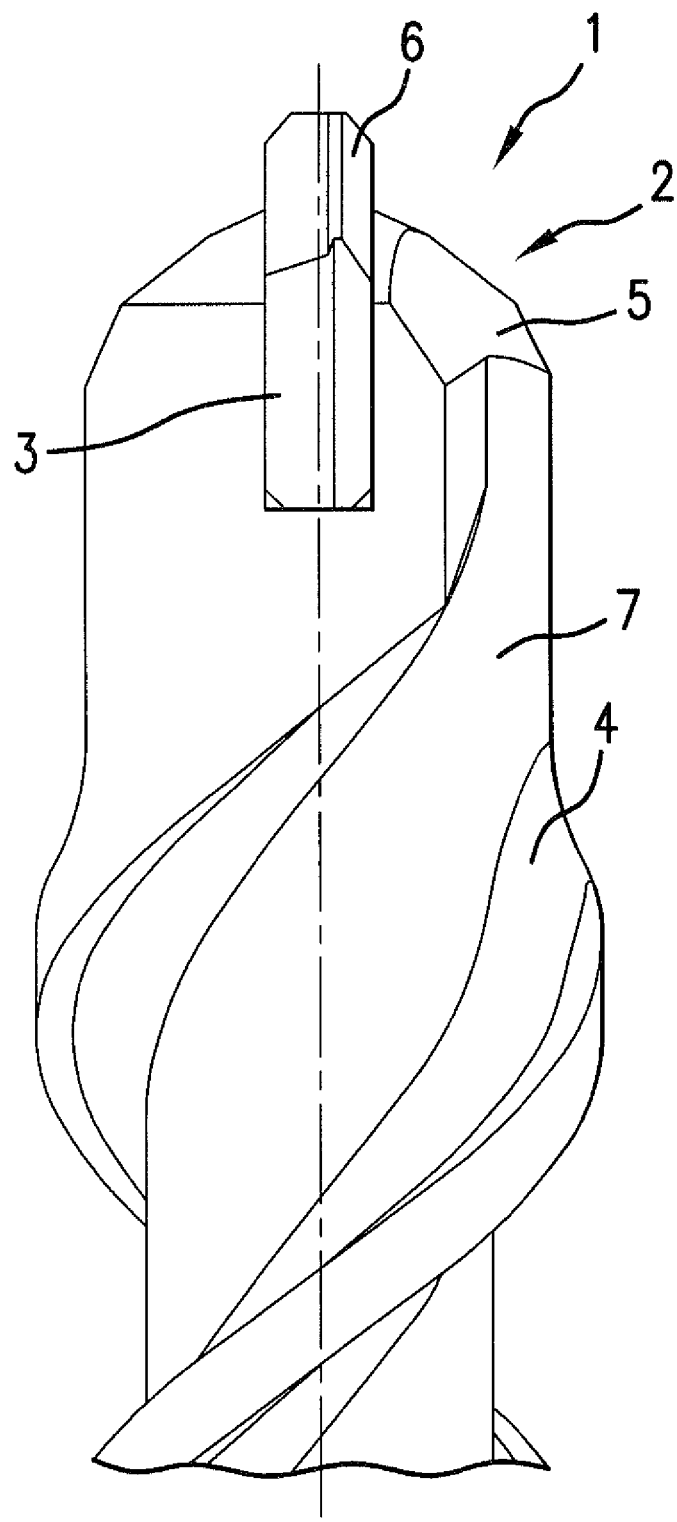

FIG. 1b shows a top view of the boring head 2 of drilling tool 2. FIG. 1c shows a side view of drilling tool 1 shown in FIG. 1a, shown from arrow direction Ic. In this view, an angled surface 5 on drilling head 2 is visible, angled surface 5 being located in front of a cutting surface 6 of cutting element 3 and conveying bore dust into bore dust groove 7 of drill twist 4.

Figure 2D:
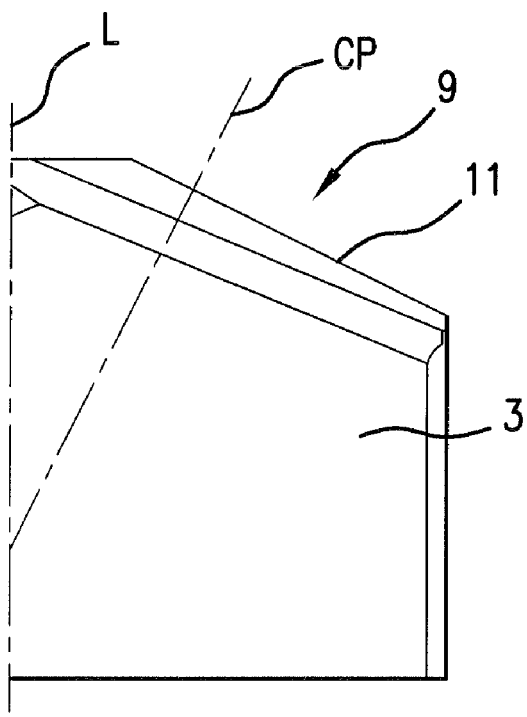
Figure 2E:
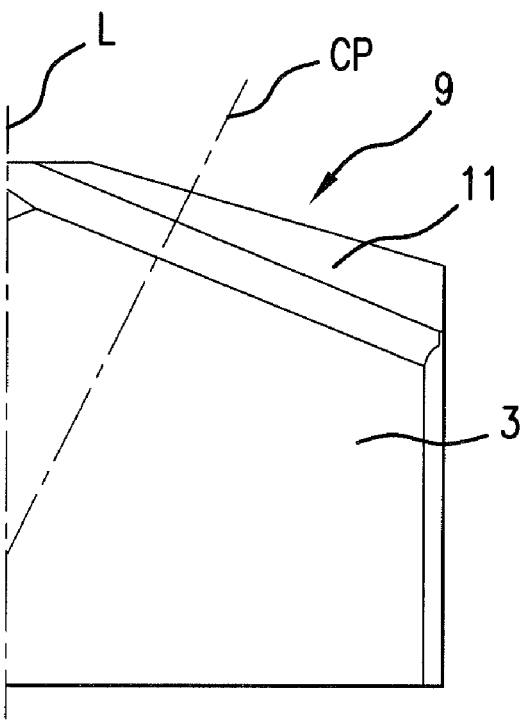

FIGS. 2a through 2c show cutting element 3 of the drilling tool shown in individual views in FIGS. 1a through 1c. Cutting element 3, which is designed as cutting plate 3, is designed symmetrical to a longitudinal axis L and has two principal cutting edges 8, 9. Due to the symmetrical design, only principal cutting edge 8 will be described in greater detail below. Principal cutting edge 8 is defined by cutting face 6 and a free face 10 which, together, form a cutting edge 11. Free face 10 is composed of a first free face section 10a and a second free face section 10b. Furthermore, cutting element 3 is characterized by a chisel edge 12. In FIG. 2b, which shows a side view of FIG. 2a from arrow direction 11b, first free face section 10a is designed as a convexly bulged surface or a convex bulge 13 that extends parallel to cutting edge 11. Together with an associated section of cutting face 6, first free face section 10a defines a rib 14, as viewed from a spacial perspective. A cutting plane CP is indicated in FIGS. 2a and 2c as an example. Cutting plane CP is intersected at a right angle by cutting edge 11.

FIGS. 3 through 14 show sections through cutting elements 3 that lie in a cutting plane CP, which is designed similar to cutting plane CP shown in FIGS. 2a and 2c. To ensure that all details of the figures can be seen, the cutting surface was not shaded in any of the figures.

Figure 3:
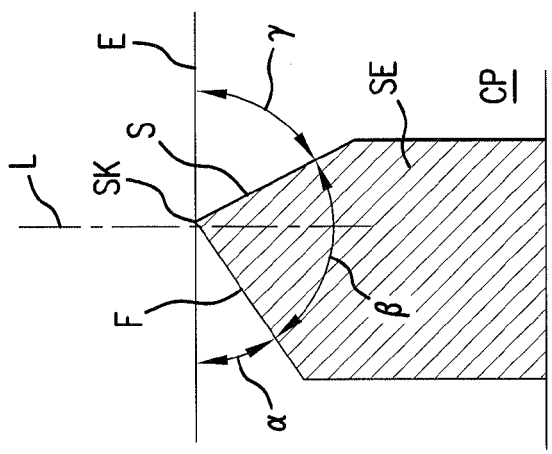
FIG. 3 shows a sectional view through a traditional cutting element as an explanation of the drawings.

To explain the terms, a sectional view through a conventional cutting element SE known from the related art is shown in FIG. 3. A free face F has a free face angle α with a plane E that is perpendicular to longitudinal axis L. Furthermore, a cutting face S has a cutting face angle γ with this plane E. Together, free face F and cutting face S form a wedge angle β and define the shape of cutting edge SK.

Figure 4:
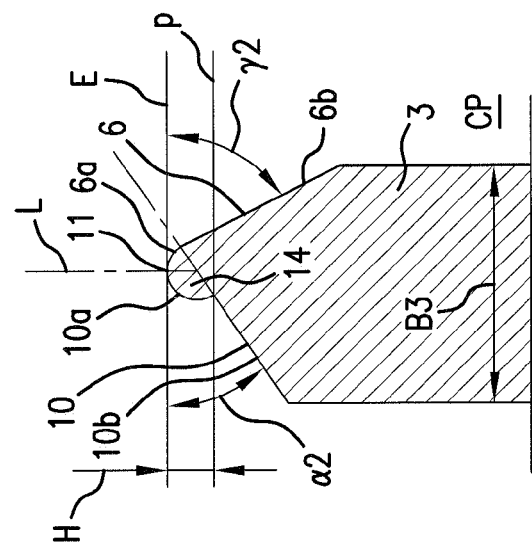

FIG. 4 shows, after the embodiments depicted in FIGS. 1a through 1c and 2a through 2c, a second embodiment of a cutting element 3 for a drilling tool according to the present invention. A cutting edge 11 of cutting element 3 extends along a point of intersection of a horizontal plane E with cutting element 3. Along the side of cutting edge 11, free face 10 extends in a first free face section 10a with a convexly bulged cross section, and in a second free face section 10b at a free face angle $\alpha_2$. A cutting face 6 is also composed of a first, convexly bulged cutting surface section 6a and a second, straight cutting surface section 6b, which extends at an angle $\gamma_2$. First free face section 10a, which defines a rib 14 as viewed from a spacial perspective, has a vertical height H, which is measured as the distance between plane E and a further plane P extending in parallel with plane E and perpendicularly to longitudinal axis L. Plane P intersects cutting element 3 at the transition of first free face section 10a into second free face section 10b. Vertical height H of rib 14 has values ranging from 0.1 mm to 1.0 mm. Cutting element 3 has a width $B_3$ which, depending on the diameter of the drilling tool, can range from 1 mm to 6 mm, e.g., when a cutting plate is provided. The rib is shown enlarged in the schematic sectional view.

Figure 5:
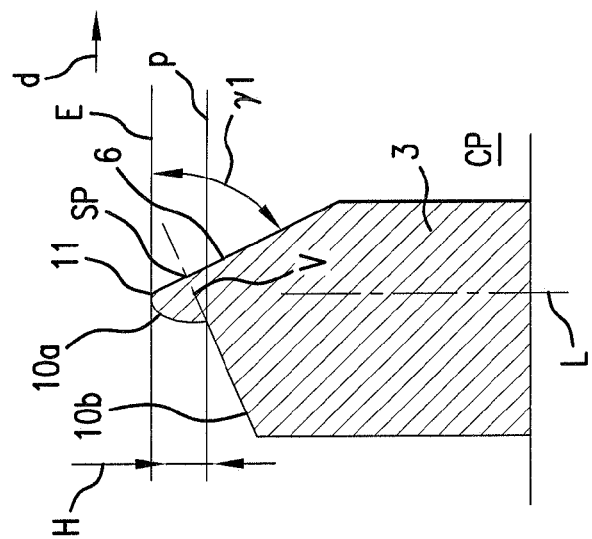

A third embodiment of cutting element 3 for a drilling tool according to the present invention is shown in FIG. 5. Unlike the cutting element shown in FIG. 4, cutting element 3 has a single-component cutting surface 6, which extends at a cutting angle $\gamma_1$ without changing direction up to cutting edge 11. A first and second free face section 10a, 10b are designed similar to cutting element 3 shown in FIG. 4. An extension V of second free face section 10b in a direction of rotation d intersects cutting face 6 at a point of intersection SP that is located below cutting edge 11.

Figure 8:
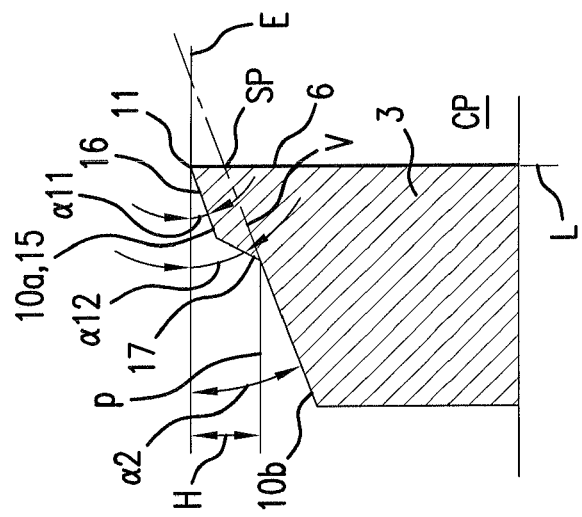
Figure 7:
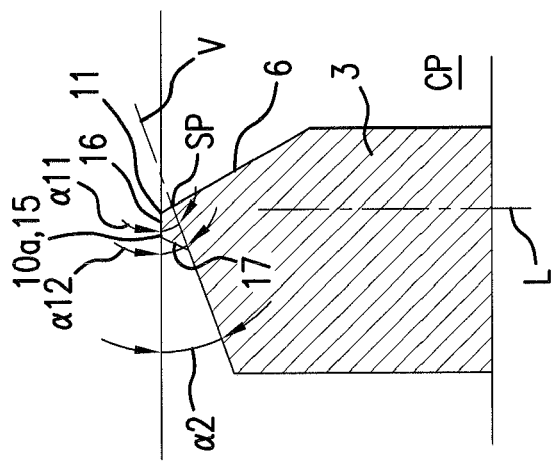
Figure 6:
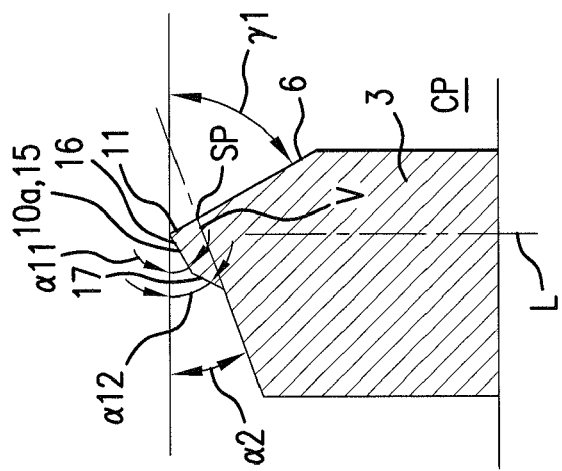

Fourth, fifth and sixth embodiments of cutting element 3 for a drilling tool according to the present invention are shown in FIGS. 6 through 8. The aspect shared by these three embodiments is the fact that a first free face section 10a defines a convex polygon outline 15. Sections 16, 17 of convex polygon 15 have different free face angles $\alpha_{11}$ and $\alpha_{12}$. With all three embodiments, an extension V of second free face section 10b intersects cutting element 3 and cutting face 6 below a cutting edge 11 at a point of intersection SP. Vertical height H of rib 14 is indicated in FIG. 8. Vertical height H is defined as a distance between planes E and P, with which longitudinal axis L are perpendicular and which intersect a cutting edge 11 and the transition from first free face section 10a into a second free face section 10b.

Further embodiments of cutting element 3 for a drilling tool according to the present invention are shown in FIGS. 9 through 14. The description of the individual embodiments will focus exclusively on the unique features of the embodiments. The embodiments according to FIG. 9, as do the embodiments according to FIGS. 10 and 14, show a second free face section 10b with a bulged extension, the tangential extension V of which intersects a free face 6 composed of two sections 6a, 6b at a point of intersection SP below a cutting edge 11.

The cutting element according to FIG. 11 has a free face section 10b that slants in the same direction as a cutting face 6.

With the tenth embodiment according to FIG. 12, a first cutting face section 6a is designed as a concave bulge.

Finally, FIG. 13 shows an eleventh embodiment of a cutting element 3 for a drilling tool according to the present invention, with which a first free face section 10a is designed as a convex polygon outline 15, the first section 16 of which extends parallel to a second free face section 10b. First free face section 10a and an associated first cutting face section 6a define a rib 14, as viewed from a spacial perspective, above a plane P (rib 14 is shaded for emphasis). Rib 14 has a horizontal width B that ranges from 0.2 mm to 1.0 mm.

To better explain the present invention, reference numbers are also included in the embodiments shown in FIGS. 4 through 14 that are not expressly referred to in the description of the particular figure. These are reference numerals that are significant for all figures in the same manner.

The present invention is not limited to the exemplary embodiments shown or described. Rather, it includes refinements of the present invention within the scope of patent claims. In particular, the present invention also provides a drilling tool, the first free face section of which is designed as a convex polygon outline with three and more sections. In terms of the free face angles of the individual sections of a convex polygon outline, the following typically applies: $\alpha_{11} < \alpha_{12} < \alpha_{13} \ldots < \alpha_{1n}$. In deviation from the exemplary embodiments shown, the present invention also provides cutting elements, the cutting edge or cutting edges of which have a polygonal shape and/or a wavy shape as viewed from above and/or the side.

The embodiment of the cutting lip according to the present invention is also provided for cutting elements that are designed without a chisel edge or a centering point. The cutting elements can also be asymmetrical in design.

REFERENCE NUMERALS

1 Drilling tool
2 Boring head
3 Cutting element, cutting plate
4 Drill twist
5 Angled surface of boring head 2
6 Cutting face
6a, 6b First and second cutting face section
7 Bore dust groove
8 Principal cutting edge
9 Principal cutting edge
10 Free face
10a, 10b First and second free face section
11 Cutting edge
12 Chisel edge
13 Convex bulge
14 Rib
15 Convex polygon outline
16 Section of 15
17 Section of 15
α Free face angle
β Wedge angle
γ Cutting face angle CP Cutting plane
B Horizontal width of 14
B₃ Width of 3
E Plane perpendicular to L
H Vertical height of 14
L Longitudinal axis of drilling tool 1
P Plane perpendicular to L
SE Cutting element
SP Point of intersection of 6 and V
V Extension of second free face section 10b
d Direction of rotation of 1 and 3

What is claimed is:

1. A drilling tool (1) for percussion drilling, which comprises a cutting element (3) that is configured as a plate (3) or head and that has at least one cutting edge (11) defined by a cutting face (6) and a free face (10),
   wherein the cutting edge (11) is associated with a first free face section (10a) which lies in a cutting plane (CP) and is followed by a second free face section (10b), wherein the cutting plane (CP) is cut at a right angle to the cutting edge (11) and wherein the first free face section (10a) is convex and is limited by a convex bulge (13) or a convex polygon outline (15), while the second free face section (10b) is straight, wherein a rib (14) is defined by the first free face section (10a) and an associated first cutting face section (6a), wherein a vertical height (H) of said rib (14) ranges from 0.1 mm to 1.0 mm, wherein
   an extension (V) of the second free face section (10b) extends in a direction of rotation (d) of the drilling tool (1) through the cutting element (3) below the cutting edge (11), and wherein said extension (V) defines an intersection and dividing line between the first free face section (10a) and the second free face section (10b).

2. The drilling tool as recited in claim 1, wherein the vertical height (H) of the rib (14) ranges from 0.1 mm to 0.5 mm.

3. The drilling tool as recited in claim 1, wherein the vertical height (H) of the rib (14) increases toward the longitudinal axis (L) of the drilling tool.

4. The drilling tool as recited in claim 1, wherein the vertical height (H) of the rib (14) decreases toward the longitudinal axis (L).

5. The drilling tool as recited in claim 1, wherein at least one second free face section (10b) follows the first free face section (10a).

6. The drilling tool as recited in claim 1, wherein at least one second cutting face section (6b) follows the first cutting face section (6a).

7. A drilling tool (1) for percussion drilling, which comprises a cutting element (3) that is configured as a plate (3) or head and that has at least one cutting edge (11) defined by a cutting face (6) and a free face (10),
   wherein the cutting edge (11) is associated with a first free face section (10a) which lies in a cutting plane (CP) and is followed by a second free face section (10b), wherein the cutting plane (CP) is cut at a right angle to the cutting edge (11) and wherein the first free face section (10a) is convex and is limited by a convex bulge (13) or a convex polygon outline (15), while the second free face section (10b) is straight, wherein a rib (14) is defined by the first free face section (10a) and an associated first cutting face section (6a), and wherein a vertical height (H) of the rib (14) ranges from 0.1 mm to 0.5 mm.

8. A drilling tool (1) for percussion drilling, which comprises a cutting element (3) that is configured as a plate (3) or head and that has at least one cutting edge (11) defined by a cutting face (6) and a free face (10),
   wherein the cutting edge (11) is associated with a first free face section (10a) which lies in a cutting plane (CP) and is followed by a second free face section (10b), wherein the cutting plane (CP) is cut at a right angle to the cutting edge (11) and wherein the first free face section (10a) is convex and is limited by a convex bulge (13) or a convex polygon outline (15), while the second free face section (10b) is straight, wherein a rib (14) is defined by the first free face section (10a) and an associated first cutting face section (6a), wherein a vertical height (H) of the rib (14) ranges from 0.1 mm to 0.5 mm,
   wherein the vertical height (H) is a distance between a first plane (P) and a second plane (E), wherein said first plane (P) extends perpendicular to a longitudinal axis (L) and is parallel with the second plane (E), and wherein the first plane (P) intersects the cutting element (3) at a transition of the first free face section (10a) into the second free face section (10b), and wherein the second plane (E) is cut by said cutting edge (11).

9. A drilling tool (1) for percussion drilling, which comprises a cutting element (3) that is configured as a plate (3) or head and that has at least one cutting edge (11) defined by a cutting face (6) and a free face (10),
   wherein the cutting edge (11) is associated with a first free face section (10a) which lies in a cutting plane (CP) and is followed by a second free face section (10b), wherein the cutting plane (CP) is cut at a right angle to the cutting edge (11) and wherein the first free face section (10a) is convex and is limited by a convex bulge (13) or a convex polygon outline (15), while the second free face section (10b) is straight, wherein a rib (14) is defined by the first free face section (10a) and an associated first cutting face section (6a), wherein a vertical height (H) of said rib (14) ranges from 0.1 mm to 1.0 mm, and wherein the vertical height (H) of the rib (14) increases toward the longitudinal axis (L) of the drilling tool.

10. A drilling tool (1) for percussion drilling, which comprises a cutting element (3) that is configured as a plate (3) or head and that has at least one cutting edge (11) defined by a cutting face (6) and a free face (10),
    wherein the cutting edge (11) is associated with a first free face section (10a) which lies in a cutting plane (CP) and is followed by a second free face section (10b), wherein the cutting plane (CP) is cut at a right angle to the cutting edge (11) and wherein the first free face section (10a) is convex and is limited by a convex bulge (13) or a convex polygon outline (15), while the second free face section (10b) is straight, wherein a rib (14) is defined by the first free face section (10a) and an associated first cutting face section (6a), wherein a vertical height (H) of said rib (14) ranges from 0.1 mm to 1.0 ram, wherein the vertical height (H) of the rib (14) decreases toward the longitudinal axis (L).

\* \* \* \* \*